(12) United States Patent
Lee

(10) Patent No.: US 9,575,571 B2
(45) Date of Patent: Feb. 21, 2017

(54) CONTACT TYPE FINGER MOUSE AND OPERATION METHOD THEREOF

(71) Applicant: Yoon-Jae Lee, Seoul (KR)

(72) Inventor: Yoon-Jae Lee, Seoul (KR)

(73) Assignee: Yoon-Jae Lee, Seoul (KR)

( * ) Notice: Subject to any disclaimer, the term of this patent is extended or adjusted under 35 U.S.C. 154(b) by 106 days.

(21) Appl. No.: 14/415,385

(22) PCT Filed: Jul. 12, 2013

(86) PCT No.: PCT/KR2013/006279
§ 371 (c)(1),
(2) Date: Jan. 16, 2015

(87) PCT Pub. No.: WO2014/014240
PCT Pub. Date: Jan. 23, 2014

(65) Prior Publication Data
US 2015/0177858 A1   Jun. 25, 2015

(30) Foreign Application Priority Data

Jul. 16, 2012   (KR) .......................... 10-2012-0077213

(51) Int. Cl.
*G06F 3/0354* (2013.01)
*G06F 3/041* (2006.01)

(52) U.S. Cl.
CPC ....... *G06F 3/03543* (2013.01); *G06F 3/03547* (2013.01); *G06F 3/0414* (2013.01); *G06F 2203/0331* (2013.01)

(58) Field of Classification Search
CPC  G06F 3/0414; G06F 3/03547; G06F 3/03543; G06F 2203/0331
See application file for complete search history.

(56) References Cited

U.S. PATENT DOCUMENTS

2010/0090949 A1*   4/2010   Tianqiao ................. G06F 3/014
                                                                   345/158
2011/0043491 A1*   2/2011   Oh ......................... G06F 3/0234
                                                                   345/177

FOREIGN PATENT DOCUMENTS

| KR | 1020010077701 A | 8/2001 |
|---|---|---|
| KR | 1020040088271 A | 10/2004 |
| KR | 2020110002926 U | 3/2011 |
| KR | 1020110137677 A | 12/2011 |

\* cited by examiner

*Primary Examiner* — Shaheda Abdin
(74) *Attorney, Agent, or Firm* — William Park & Associates Ltd.

(57) ABSTRACT

The present invention relates to a contact type finger mouse and an operating method thereof. The contact type finger mouse according to one embodiment of the present invention comprises: a pressure sensor unit for sensing pressure generated between a finger and a fixed surface through a plurality of pressure sensors fixed at a lower part of the finger; a signal processing unit for determining a movement direction and a movement speed value of a mouse pointer on the basis of pressure values acquired through the sensing; and a signal transmission unit for generating control data comprising information on the determined movement direction and the determined movement speed value of the mouse pointer, and transmitting the generated control data to an interworking device.

10 Claims, 6 Drawing Sheets

CONTACT TYPE FINGER MOUSE AND OPERATION METHOD THEREOF

TECHNICAL FIELD

The present invention relates to a contact type finger mouse and an operating method thereof.

BACKGROUND ART

A type of a display device for delivering information is continuously changed. Recently, according to requirements for a small size, wearable display devices of an eyeglass type or a wristwatch type have become available.

In this manner, as wearable display devices evolve, a new type of a small wearable input device is necessary.

DISCLOSURE

Technical Problem

In the related art, a contact type finger mouse and an operating method thereof are necessary.

Technical Solution

In order to achieve the above-described objects, according to an aspect of the present invention, there is provided a contact type finger mouse. The contact type finger mouse includes a pressure sensor unit configured to detect a pressure generated between a finger and a fixed surface through a plurality of pressure sensors fixed at a lower part of the finger; a signal processing unit configured to determine a movement direction and a movement speed value of a mouse pointer based on pressure values obtained through the detection; and a signal transmission unit configured to generate control data including information on the determined movement direction of the mouse pointer and the movement speed value and transmit the data to an interworking device.

According to another aspect of the present invention, there is provided a method of operating a contact type finger mouse. The method of operating a contact type finger mouse includes: detecting a pressure generated between a finger and a fixed surface through a plurality of pressure sensors fixed at a lower part of the finger; determining a movement direction and a movement speed value of a mouse pointer based on pressure values obtained through the detection; and generating control data including information on the determined movement direction of the mouse pointer and the movement speed value and transmitting the data to an interworking device.

In addition, all features of the present invention are not listed in the above-described aspects. Various features of the present invention and resulting advantages and effects will be understood in detail with reference to the following detailed embodiments.

Advantageous Effects

The contact type finger mouse and the operating method thereof may be provided.

MODES OF THE INVENTION

Figure 1:
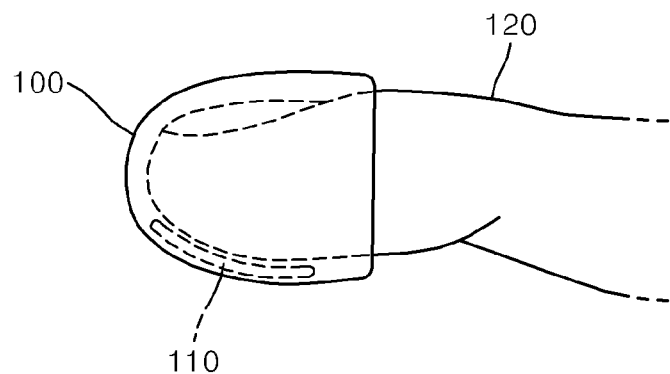
FIG. 1 is a diagram illustrating a form of a contact type finger mouse including a plurality of pressure sensors according to an embodiment of the present invention.

Hereinafter, exemplary embodiments of the present invention that are easily performed by those skilled in the art will be described in detail with reference to the accompanying drawings. However, when it is determined that detailed descriptions of exemplary embodiments of the present invention of related well-known functions or configurations unnecessarily obscure the gist of the present invention, the detailed descriptions thereof will be omitted. Also, parts performing similar functions and operations through the drawings are denoted by the same reference numerals.

In addition, throughout this specification, when a part is referred to as being "connected" to another part, it includes "directly connected" and "indirectly connected" via an intervening part. Also, when a certain part "includes" a certain component, this does not exclude other components from being included unless described otherwise, and other components may in fact be included.

Hereinafter, a contact type finger mouse and an operating method thereof according to the present invention will be described. In particular, a contact type finger mouse that is mounted on a finger and is able to move a mouse pointer according to movement of the finger and an operating method thereof will be described. Accordingly, it is possible to implement a more reliable and compact finger mouse.

FIG. 1 is a diagram illustrating a form of a contact type finger mouse according to an embodiment of the present invention.

As illustrated, a contact type finger mouse 100 is mounted on a distal end of a finger 120 and manipulates movement of a mouse pointer output onto a display screen of an interworking device (not illustrated) according to movement of the finger 120. In particular, the contact type finger mouse 100 analyzes a pressure generated between the finger 120 and a fixed surface and controls a movement direction and a movement speed of the mouse pointer.

For this purpose, the contact type finger mouse 100 includes a plurality of pressure sensors 110. Here, the plurality of pressure sensors 110 are arranged in the form of an N×M array, mounted on a lower surface of the contact type finger mouse 100, and detect a pressure generated between the finger 120 and the fixed surface. Here, the contact type finger mouse 100 may be implemented as a thimble type such that the plurality of pressure sensors 110 can be fixed at a lower part of the distal end of the finger 120 when it is mounted on the distal end of the finger 120.

Here, the interworking device (not illustrated) is a device capable of transmitting and receiving control data to and from the contact type finger mouse 100, and may be implemented as, for example, a computer, a notebook or a mobile phone. The interworking device controls the mouse pointer output onto the display screen based on the control data from the contact type finger mouse 100.

Figure 2:
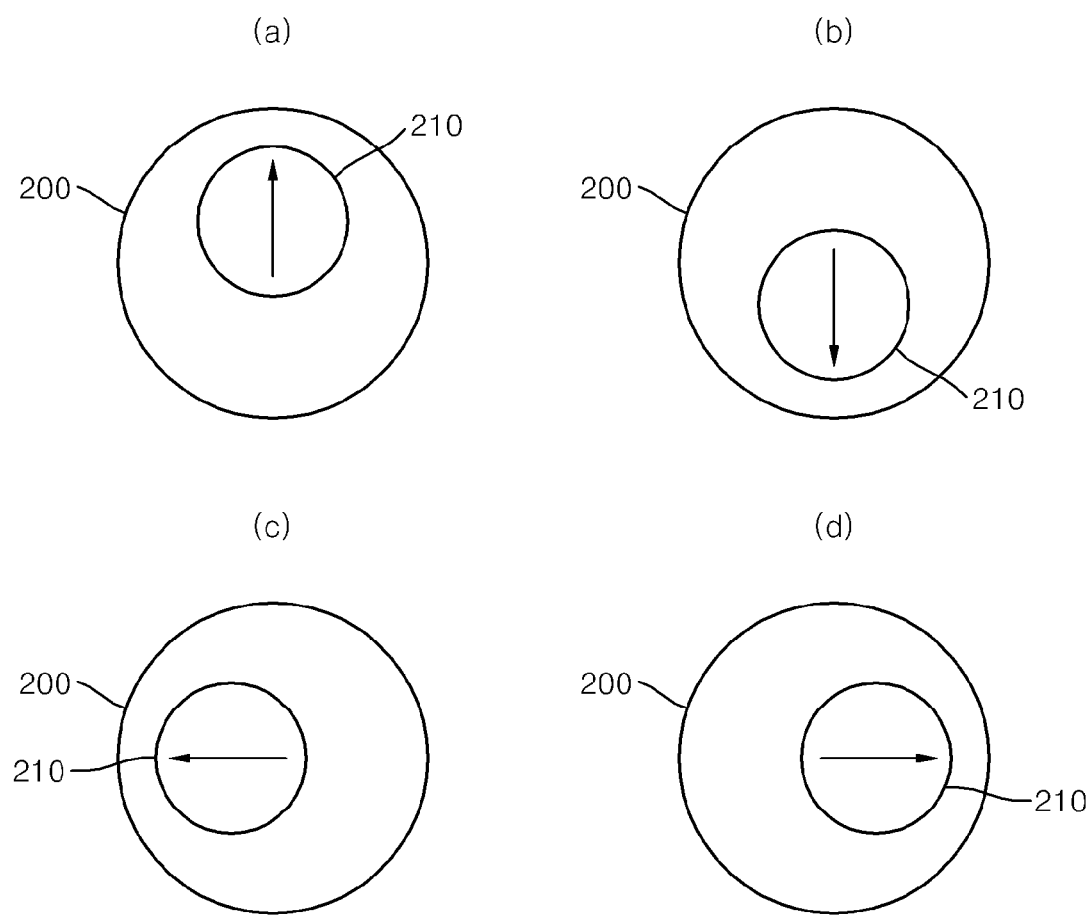
FIG. 2 shows diagrams illustrating a principle that is applied to determine a movement direction of a mouse pointer of the contact type finger mouse according to the embodiment of the present invention.

FIG. 2 shows diagrams illustrating a principle that is applied to determine a movement direction of a mouse pointer of the contact type finger mouse according to the embodiment of the present invention.

As illustrated in FIG. 2, FIGS. 2A, 2B, 2C, and 2D illustrate a distribution of a pressure generated between the finger and the fixed surface according to movement of the finger when the finger moves up, down, left, or right in contact with the fixed surface. Here, a large circle 200 represents the contact area between the finger and the fixed surface when the finger moves, and a small circle 210 represents a distribution of the pressure of the contact area and represents a part to which a relatively high pressure is applied. An arrow indicates a direction in which the finger moves. While the finger moves in contact with the fixed surface, a distribution of the pressure generated in the contact area between the finger and the fixed surface is concentrated on a front part in a moving direction. That is, a relatively high pressure is applied to the front part in the moving direction.

Figure 3:
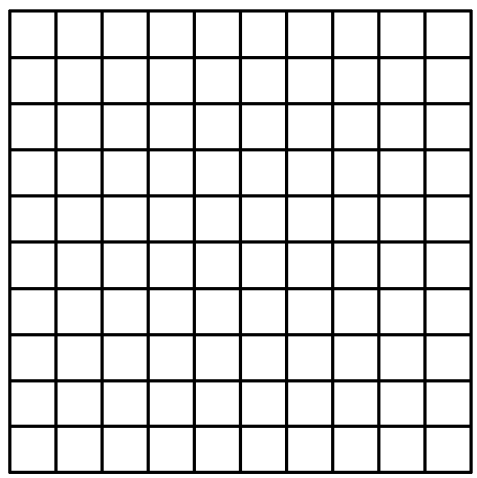
FIG. 3 is a diagram illustrating a form in which a plurality of pressure sensors are arranged in the contact type finger mouse according to the embodiment of the present invention.

Based on such a principle, the present invention proposes a contact type finger mouse in which a distribution of a pressure of the contact area between the finger and the fixed surface is analyzed and a movement direction of the mouse pointer is determined and an operating method thereof. For this purpose, the contact type finger mouse according to the present invention includes a plurality of pressure sensors and detects a pressure generated between the finger and the fixed surface through the plurality of pressure sensors. Here, the plurality of pressure sensors are arranged in the form of an N×M (for example, 10×10) array as illustrated in FIG. 3 and are mounted on a lower surface of the contact type finger mouse.

Figure 4:
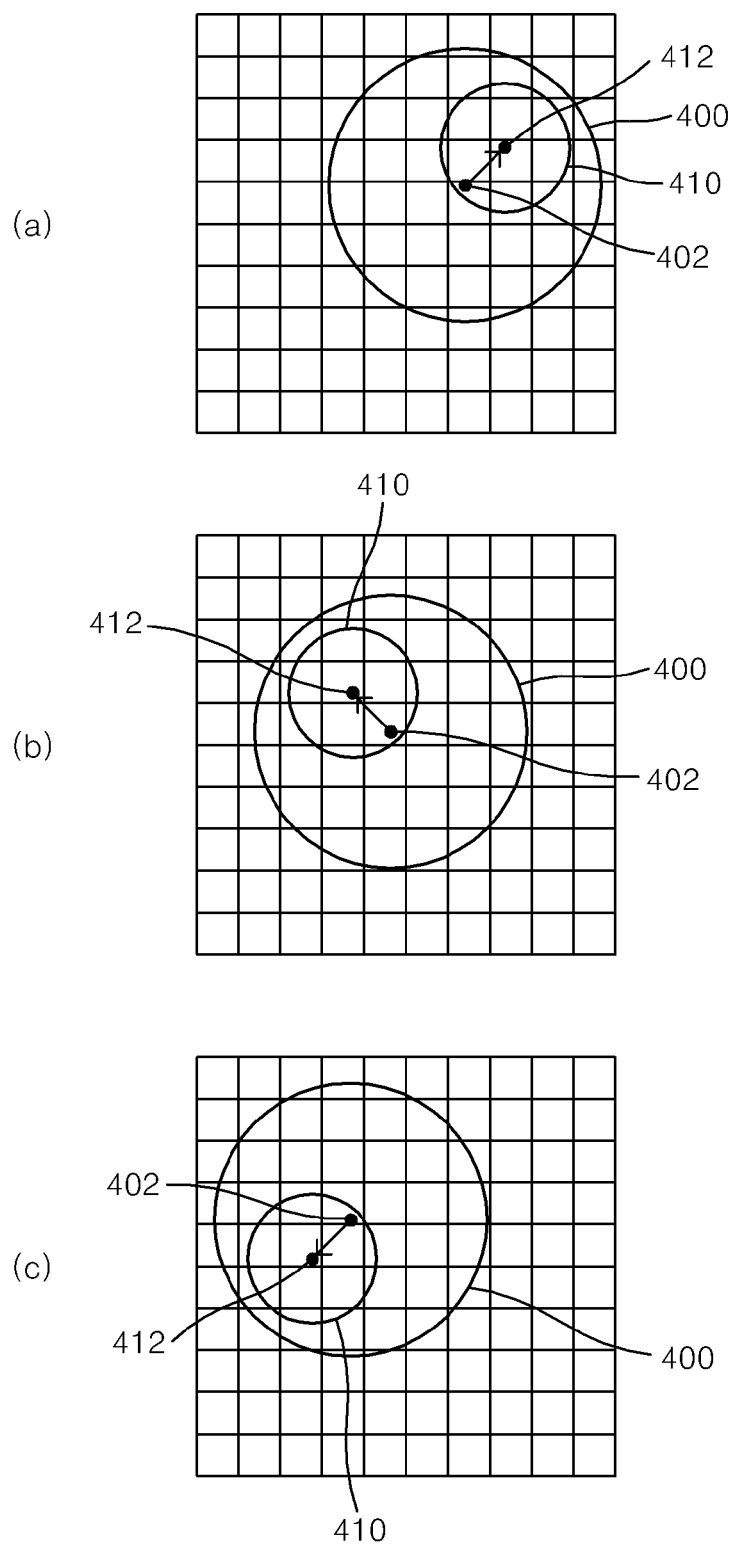
FIG. 4 shows diagrams illustrating a method of analyzing a distribution of a pressure of a contact area between a finger and a fixed surface and determining a movement direction of a mouse pointer of the contact type finger mouse according to the embodiment of the present invention.

FIG. 4 shows diagrams illustrating a method of analyzing a distribution of a pressure of a contact area between a finger and a fixed surface and determining a movement direction of a mouse pointer of the contact type finger mouse according to the embodiment of the present invention.

As illustrated in FIG. 4, FIGS. 4A, 4B, and 4C show a distribution of a pressure generated between the finger and the fixed surface according to movement of the finger when the finger moves toward the top-right, the top-left, or the bottom-left in contact with the fixed surface and the movement direction of the mouse pointer determined based on the distribution. Here, a large circle 400 represents the contact area between the finger and the fixed surface when the finger moves. A small circle 410 represents a distribution of the pressure of the contact area and represents a part to which a relatively high pressure is applied. An arrow indicates a direction in which the finger moves.

The contact type finger mouse detects a pressure generated between the finger and the fixed surface through the plurality of pressure sensors that are arranged in the form of an N×M array and mounted on a lower surface of the contact type finger mouse, determines the contact area between the finger and the fixed surface based on the detection result, and determines a direction in which a relatively high pressure is applied in the contact area as the movement direction of the mouse pointer. That is, the contact type finger mouse determines a center 402 (that is, a center of the large circle 400) of the contact area and a center of gravity 412 (that is, a center of the small circle 410) of the pressure based on pressure values of the plurality of pressure sensors, and determines a direction from the determined center 402 of the contact area to the center of gravity 412 of the pressure as the movement direction of the mouse pointer.

Figure 5:
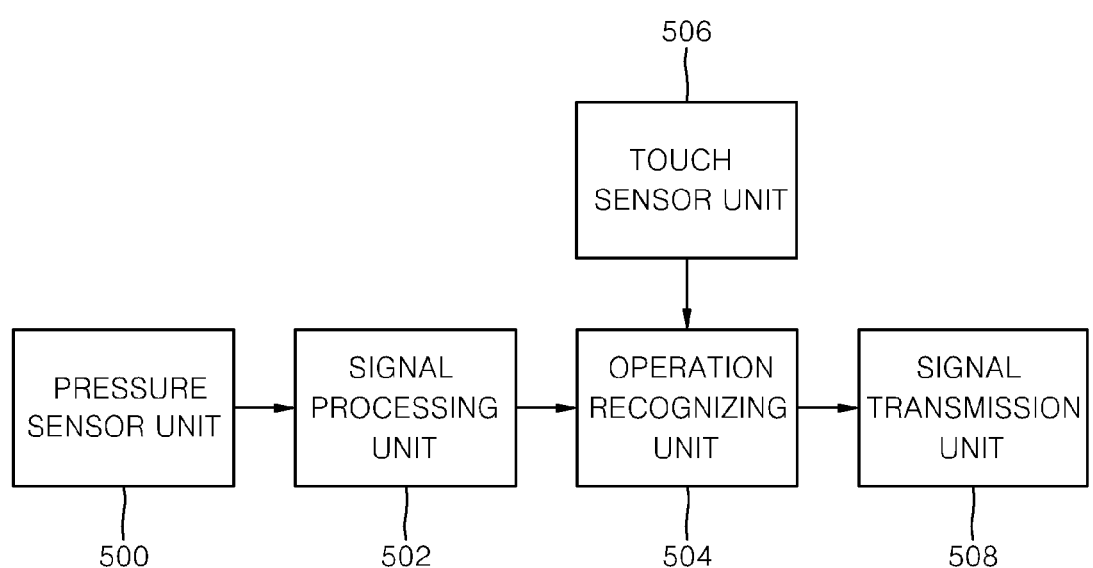
FIG. 5 is a block diagram illustrating a device configuration of the contact type finger mouse according to the embodiment of the present invention.

FIG. 5 is a block diagram illustrating a device configuration of the contact type finger mouse according to the embodiment of the present invention.

As illustrated, the contact type finger mouse includes a pressure sensor unit 500, a signal processing unit 502, an operation recognizing unit 504, a touch sensor unit 506, and a signal transmission unit 508.

As illustrated in FIG. 5, the pressure sensor unit 500 detects a pressure generated between the finger and the fixed surface through the plurality of pressure sensors fixed at the lower part of the finger. Here, the plurality of pressure sensors are arranged in the form of an N×M array, mounted on a lower surface of the contact type finger mouse, and may be implemented as polymer-based haptic sensors. Also, the plurality of pressure sensors may include a piezoelectric element, convert the pressure generated due to finger contact into electrical energy through the element, and supply power to the contact type finger mouse.

The signal processing unit 502 determines a movement direction and a movement speed value of the mouse pointer based on pressure values obtained through the detection. Here, the signal processing unit 502 analyzes a distribution of the pressure of the contact area between the finger and the fixed surface and determines the movement direction of the mouse pointer. Specifically, the signal processing unit 502 determines whether there is a pressure sensor that obtains a pressure value equal to or greater than a first threshold value through the detection. When there is the pressure sensor that obtains a pressure value equal to or greater than the first threshold value, it is determined that the finger and the fixed surface are in a contact state. When there is no pressure sensor that obtains a pressure value equal to or greater than the first threshold value, it is determined that the finger and the fixed surface are in a contact release state. Also, where there is the pressure sensor that obtains a pressure value equal to or greater than the first threshold value, the signal processing unit 502 determines the pressure sensor that obtains a pressure value equal to or greater than the first threshold value as a contact sensor positioned in the contact area between the finger and the fixed surface and determines a center of the contact area and a center of gravity of the pressure based on pressure values of the plurality of pressure sensors. Then, the signal processing unit 502 determines whether a distance between the determined center of the contact area and center of gravity of the pressure is less than a second threshold value. When the distance between the determined center of the contact area and center of gravity of the pressure is equal to or greater than the second threshold value, the signal processing unit 502 determines a direction from the determined center of the contact area to the center of gravity of the pressure as the movement direction of the mouse pointer and determines the movement speed value of the mouse pointer based on a sum of the determined pressure values of the contact sensors. When the distance between the determined center of the contact area and center of gravity of the pressure is less than the second threshold value, the signal processing unit 502 determines the movement speed value of the mouse pointer as 0.

The operation recognizing unit 504 recognizes a finger operation. Specifically, the operation recognizing unit 504 recognizes the finger operation as a movement operation when the movement direction and the movement speed value of the mouse pointer are determined in a contact state, and recognizes the finger operation as a movement stop operation when the movement speed value of the mouse pointer is determined as 0 in a contact state. Also, the operation recognizing unit 504 recognizes the finger operation as a dragging operation when the movement direction and the movement speed value of the mouse pointer are determined in a contact state and contact is detected at the same time, and recognizes the finger operation as a clicking operation when the state changes from a contact release state to a contact state again within a predetermined time after an initial contact state. Here, the operation recognizing unit 504 determines a position at the time of contact release as a position at which a click command is applied.

Figure 7:
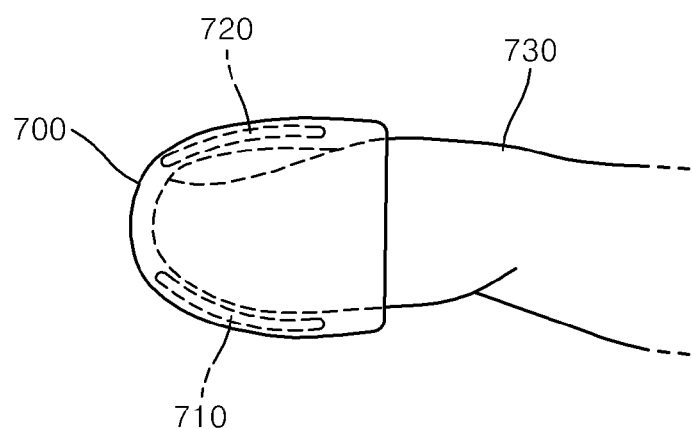
FIG. 7 is a diagram illustrating a form of a contact type finger mouse including a plurality of pressure sensors and a touch sensor according to an embodiment of the present invention.

The touch sensor unit 506 detects contact through a touch sensor fixed at an upper part of the finger. Here, the touch sensor is mounted on an upper surface of the contact type finger mouse. For example, as illustrated in FIG. 7, a plurality of pressure sensors 710 are mounted on a lower surface of a contact type finger mouse 700 that is mounted on a distal end of a finger 730, and a touch sensor may be mounted on an upper surface of the contact type finger mouse 700.

According to the recognition result of the operation recognizing unit 504, the signal transmission unit 508 generates control data of a type that can be recognized by the interworking device and transmits the data to the interworking device. The signal transmission unit 508 generates control data including information on the determined movement direction of the mouse pointer and the movement speed value when the operation recognizing unit 504 recognizes the movement operation, and generates control data including the determined movement speed value 0 of the mouse pointer when the operation recognizing unit 504 recognizes the movement stop operation. Also, the signal transmission unit 508 generates control data including information on the determined movement direction of the mouse pointer and the movement speed value and a drag command when the operation recognizing unit 504 recognizes the dragging operation, and generates control data including the click command when the clicking operation is recognized.

Figure 6:
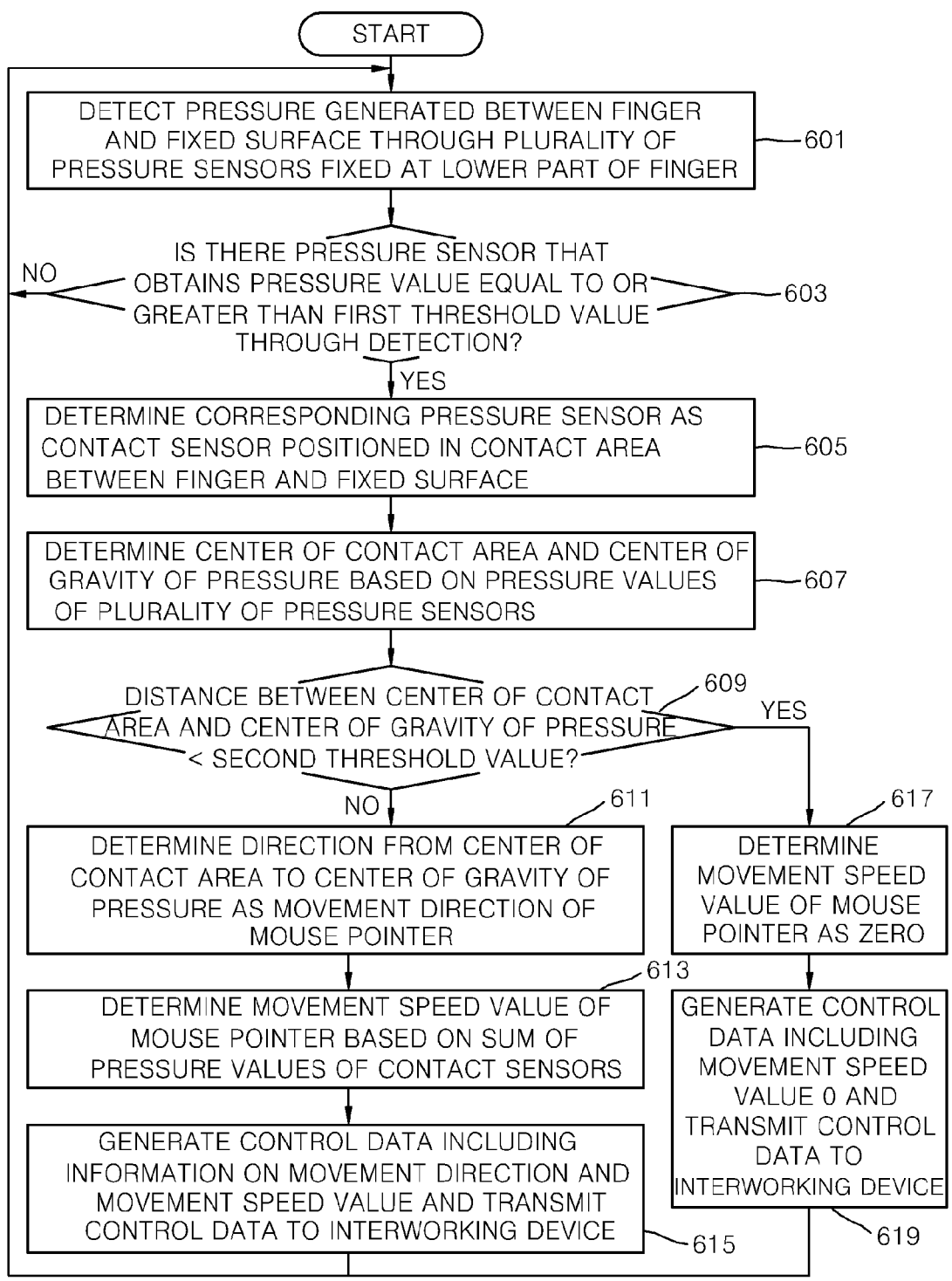
FIG. 6 is a flowchart illustrating a method of operating a contact type finger mouse according to an embodiment of the present invention.

FIG. 6 is a flowchart illustrating a method of operating a contact type finger mouse according to an embodiment of the present invention.

As illustrated in FIG. 6, in operation 601, the contact type finger mouse detects a pressure generated between the finger and the fixed surface through the plurality of pressure sensors fixed at a lower part of the finger. Here, the plurality of pressure sensors are arranged in the form of an N×M array, mounted on a lower surface of the contact type finger mouse, and include a piezoelectric element.

Then, in operation 603, the contact type finger mouse determines whether there is a pressure sensor that obtains a pressure value equal to or greater than a first threshold value based on pressure values obtained through the detection.

In operation 603, when it is determined that there is no pressure sensor that obtains a pressure value equal to or greater than the first threshold value, the contact type finger mouse determines that the finger and the fixed surface are in a contact release state. The process returns to operation 601 and subsequent operations are repeated.

On the other hand, in operation 603, when it is determined that there is the pressure sensor that obtains a pressure value equal to or greater than the first threshold value, the contact type finger mouse determines that the finger and the fixed surface are in a contact state. In operation 605, the pressure sensor that obtains a pressure value equal to or greater than the first threshold value is determined as a contact sensor positioned in the contact area between the finger and the fixed surface.

Then, in operation 607, the contact type finger mouse determines the center of the contact area and the center of gravity of the pressure based on pressure values of the plurality of pressure sensors.

Here, the center of the contact area $(x_c, y_c)$ is determined based on the following [Equation 1].

$$x_c = \frac{\sum_{j=1}^{N} \sum_{i=1}^{M} x_i \times E(x_i, y_j)}{\sum_{j=1}^{N} \sum_{i=1}^{M} E(x_i, y_j)}$$ [Equation 1]

$$y_c = \frac{\sum_{j=1}^{N} \sum_{i=1}^{M} y_j \times E(x_i, y_j)}{\sum_{j=1}^{N} \sum_{i=1}^{M} E(x_i, y_j)}$$

wherein, $\begin{cases} E(x_i, y_j) = 1, & \text{if } p(x_i, y_j) \geq THRE, \\ E(x_i, y_j) = 0, & \text{if } p(x_i, y_j) < THRE \end{cases}$ Here, $E(x_i, y_i)$ denotes whether a pressure sensor of $(x_i, y_i)$ coordinates among a plurality of pressure sensors that are arranged in the form of an N×M array is a contact sensor. According to whether a pressure value $p(x_i, y_i)$ obtained by the pressure sensor of $(x_i, y_i)$ coordinates is equal to or greater than a first threshold value, $E(x_i, y_i)$ is determined as a value of 1 indicating that the pressure sensor is the contact sensor or as a value of 0 indicating that the pressure sensor is not the contact sensor. That is, the center of the contact area $(x_c, y_c)$ may be determined when the center of sensors that are in contact among the plurality of pressure sensors that are arranged in the form of an N×M array is calculated.

Also, the center of gravity of the pressure is determined based on the following [Equation 2].

$$x_{pc} = \frac{\sum_{j=1}^{N} \sum_{i=1}^{M} x_i \times p(x_i, y_j)}{\sum_{j=1}^{N} \sum_{i=1}^{M} p(x_i, y_j)}$$ [Equation 2]

$$y_{pc} = \frac{\sum_{j=1}^{N} \sum_{i=1}^{M} y_j \times p(x_i, y_j)}{\sum_{j=1}^{N} \sum_{i=1}^{M} p(x_i, y_j)}$$

Then, in operation 609, the contact type finger mouse determines whether a distance between the determined center of the contact area and center of gravity of the pressure is less than a second threshold value.

In operation 609, when it is determined that the distance between the determined center of the contact area and center of gravity of the pressure is equal to or greater than the second threshold value, the contact type finger mouse determines a direction from the determined center of the contact area to the center of gravity of the pressure as the movement direction of the mouse pointer in operation 611, and the process advances to operation 613.

Then, in operation 613, the contact type finger mouse determines the movement speed value of the mouse pointer based on a sum of the determined pressure values of the contact sensors. For example, the movement speed value of the mouse pointer may be determined as a value proportional to the sum of the determined pressure values of the contact sensors. In this manner, when the movement speed value of the mouse pointer is determined based on a sum of pressure values of the mouse pointer, the contact type finger mouse may perform control such that the mouse pointer moves faster as a pressure detected by the finger becomes higher, and the mouse pointer moves slower as a pressure detected by the finger becomes lower.

Then, in operation 615, the contact type finger mouse generates control data including information on the determined movement direction of the mouse pointer and the movement speed value and transmits the generated control data to the interworking device. Then, the process returns to operation 601 and subsequent operations are repeated. Here, the interworking device that has received the control data from the contact type finger mouse may extract the information on the movement direction of the mouse pointer and the movement speed value from the received control data and manipulate the mouse pointer output onto the display screen based on the extraction result. That is, movement of the mouse pointer may be controlled.

On the other hand, in operation 609, when it is determined that the distance between the determined center of the contact area and center of gravity of the pressure is less than the second threshold value, the contact type finger mouse determines the movement speed value of the mouse pointer as 0 in operation 617, and the process advances to operation 619.

Then, in operation 619, the contact type finger mouse generates control data including the determined movement speed value 0 of the mouse pointer and transmits the generated control data to the interworking device. Then, the process returns to operation 601 and subsequent operations are repeated. Here, the interworking device that has received control data from the contact type finger mouse may extract the movement speed value 0 of the mouse pointer from the received control data and manipulate the mouse pointer output onto the display screen based on the extraction result. That is, movement stop of the mouse pointer may be controlled.

Although not illustrated, when the state changes from a contact release state to a contact state again within a predetermined time after an initial contact state, the contact type finger mouse may recognize the finger operation as a clicking operation, generate control data including a click command, and transmit the data to the interworking device.

Also, although not illustrated, when the movement direction of the mouse pointer and the movement speed value are determined and contact is detected through the touch sensor fixed at an upper part of the finger at the same time, the contact type finger mouse may recognize the finger operation as a dragging operation, generate control data including information on the determined movement direction of the mouse pointer, the movement speed value, and a drag command, and transmit the data to the interworking device. Here, the touch sensor is mounted on an upper surface of the contact type finger mouse.

In this manner, the contact type finger mouse according to the present invention determines the movement direction of the mouse pointer according to a distribution of the pressure of the contact area between the finger and the fixed surface and controls movement of the mouse pointer so that the mouse pointer can be moved with almost no movement of the finger. Also, using pressure sensors in the form of an array, when the contact area is changed according to a posture of the finger, the mouse pointer may be moved in a direction matching the movement direction of the finger.

Also, since the contact type finger mouse according to the present invention may be driven while the finger moves in contact with the fixed surface, it can be operated in any environment and any posture. For example, the contact type finger mouse can be operated on a plane such as a desk, on a knee, on a palm, and the like, operated in a state in which a thumb and an index finger are in contact with each other, and operated in a lying state or a moving state. Accordingly, the contact type finger mouse may perform as a wearable input device that is appropriate for a wearable display device.

Also, when the contact type finger mouse according to the present invention is applied to a mobile phone, since a keyboard or a touch screen of a mobile phone in the related art is unnecessary, a size of the mobile phone may decrease. That is, when the display screen provides only a minimum amount of information and an earphone assists information providing, a type of the mobile phone may be changed to a type of a wristwatch or a ring. For example, when the mobile phone is implemented as the ring type, according to movement of the finger on which the contact type finger mouse is mounted, a corresponding menu is provided as a simple text type through a display screen of an upper part of the ring. When a clicking operation of the finger is recognized at a desired menu, a function of the mobile phone may be performed.

Also, the contact type finger mouse according to the present invention is applied to a mobile phone, it is possible to implement a mobile phone having no display screen. For example, information on a corresponding menu is delivered to the earphone according to movement of the finger on which the contact type finger mouse is mounted, and when a clicking operation of the finger is recognized at a desired menu, a function of the mobile phone may be performed. Also, a finger operation necessary for a function of the mobile phone is defined in advance, and when the finger operation is recognized, the function of the mobile phone may be performed. Also, based on the number of clicking operations of the finger that are repeated for a predetermined time, the function of the mobile phone may be performed. For example, when two clicking operations are recognized for a predetermined time, a call connection function is performed, and when three clicking operations are recognized for a predetermined time, a call termination function is performed. When one clicking operation is recognized, a menu navigation function may start and navigating and executing the menu may be performed according to movement of the finger.

Meanwhile, while detailed embodiments have been described in the detailed description of the present invention, the embodiments may be variously modified without departing from the scope of the present invention. Therefore, the scope of the present invention is defined not by the described embodiments but by the appended claims, and encompasses that fall within the scope of the appended claims.

The invention claimed is:

1. A contact type finger mouse, comprising:
   a pressure sensor unit configured to detect a pressure generated between a finger and a fixed surface through a plurality of pressure sensors fixed at a lower part of the finger;
   a signal processing unit configured to determine a movement direction and a movement speed value of a mouse pointer based on pressure values obtained through the detection; and
   a signal transmission unit configured to generate control data including information on the determined movement direction of the mouse pointer and the movement speed value and transmit the data to an interworking device,
   wherein the signal processing unit analyzes a distribution of a pressure of a contact area between the finger and the fixed surface and determines the movement direction of the mouse pointer, and
   wherein the signal processing unit determines whether there is a pressure sensor that obtains a pressure value equal to or greater than a first threshold value through the detection, determines the pressure sensor that obtains a pressure value equal to or greater than the first threshold value as a contact sensor positioned in the contact area between the finger and the fixed surface when there is the pressure sensor that obtains a pressure value equal to or greater than the first threshold value, determines a center of the contact area and a center of gravity of the pressure based on pressure values of the plurality of pressure sensors, determines a direction from the determined center of the contact area to the center of gravity of the pressure as the movement direction of the mouse pointer, and determines the movement speed value of the mouse pointer based on a sum of the determined pressure values of the contact sensors.

2. The contact type finger mouse of claim 1,
   wherein the plurality of pressure sensors are arranged in the form of an N×M array and mounted on a lower surface of the contact type finger mouse and include a piezoelectric element.

3. The contact type finger mouse of claim 1,
   wherein the signal processing unit determines whether a distance between the determined center of the contact area and center of gravity of the pressure is less than a second threshold value, and determines the movement speed value of the mouse pointer as 0 when the distance between the determined center of the contact area and center of gravity of the pressure is less than the second threshold value, and
   wherein the signal transmission unit generates control data including the determined movement speed value 0 of the mouse pointer and transmits the data to the interworking device.

4. The contact type finger mouse of claim 1, further comprising
   an operation recognizing unit configured to recognize a finger operation;
   wherein the signal processing unit determines that the finger and the fixed surface are in a contact state when there is the pressure sensor that obtains a pressure value equal to or greater than the first threshold value, and determines that the finger and the fixed surface are in a contact release state when there is no pressure sensor that obtains a pressure value equal to or greater than the first threshold value,
   wherein the operation recognizing unit recognizes the finger operation as a clicking operation when the state changes from a contact release state to a contact state again within a predetermined time after an initial contact state, and
   wherein the signal transmission unit generates control data including a click command when the clicking operation is recognized and transmits the data to the interworking device.

5. The contact type finger mouse of claim 1, further comprising:
   a touch sensor unit mounted on an upper surface of the contact type finger mouse and configured to detect contact through a touch sensor fixed at an upper part of the finger; and
   an operation recognizing unit configured to recognize a finger operation,
   wherein the operation recognizing unit recognizes the finger operation as a dragging operation when the movement direction of the mouse pointer and the movement speed value are determined and contact is detected at the same time, and
   wherein, when the dragging operation is recognized, the signal transmission unit generates control data including information on the determined movement direction of the mouse pointer, the movement speed value, and a drag command, and transmits the data to the interworking device.

6. A method of operating a contact type finger mouse, comprising:
   detecting a pressure generated between a finger and a fixed surface through a plurality of pressure sensors fixed at a lower part of the finger;
   determining a movement direction and a movement speed value of a mouse pointer based on pressure values obtained through the detection; and
   generating control data including information on the determined movement direction of the mouse pointer and the movement speed value and transmitting the data to an interworking device,
   wherein the movement direction of the mouse pointer is determined by analyzing a distribution of a pressure of a contact area between the finger and the fixed surface, and
   determining whether there is a pressure sensor that obtains a pressure value equal to or greater than a first threshold value through the detection;
   determining the pressure sensor that obtains a pressure value equal to or greater than the first threshold value as a contact sensor positioned in the contact area between the finger and the fixed surface when there is the pressure sensor that obtains a pressure value equal to or greater than the first threshold value; and
   determining a center of the contact area and a center of gravity of the pressure based on pressure values of the plurality of pressure sensors,
   wherein a direction from the determined center of the contact area to the center of gravity of the pressure is determined as the movement direction of the mouse pointer; and
   wherein the movement speed value of the mouse pointer is determined based on a sum of the determined pressure values of the contact sensors.

7. The method of claim 6,
wherein the plurality of pressure sensors are arranged in the form of N×M array and mounted on a lower surface of the contact type finger mouse and includes a piezoelectric element.

8. The method of claim 6, further comprising:
determining whether a distance between the determined center of the contact area and center of gravity of the pressure is less than a second threshold value;
determining the movement speed value of the mouse pointer as 0 when the distance between the determined center of the contact area and center of gravity of the pressure is less than the second threshold value; and
generating control data including the determined movement speed value 0 of the mouse pointer and transmitting the data to the interworking device.

9. The method of claim 6, further comprising:
determining that the finger and the fixed surface are in a contact state when there is the pressure sensor that obtains a pressure value equal to or greater than the first threshold value and determining that the finger and the fixed surface are in a contact release state when there is no pressure sensor that obtains a pressure value equal to or greater than the first threshold value;
recognizing a finger operation as a clicking operation when the state changes from a contact release state to a contact state again within a predetermined time after an initial contact state; and
generating control data including a click command when the clicking operation is recognized and transmitting the data to the interworking device.

10. The method of claim 6, further comprising:
recognizing a finger operation as a dragging operation when the movement direction of the mouse pointer and the movement speed value are determined and contact is detected at the same time through a touch sensor that is mounted on an upper surface of the contact type finger mouse and fixed at an upper part of the finger; and
generating control data including information on the determined movement direction of the mouse pointer, the movement speed value, and a drag command and transmitting the data to the interworking device when the dragging operation is recognized.

* * * * *